United States Patent
Hung

(10) Patent No.: US 9,491,435 B2
(45) Date of Patent: Nov. 8, 2016

(54) IMAGE SYNCHRONIZATION METHOD AND ASSOCIATED APPARATUS

(71) Applicant: MStar Semiconductor, Inc., Hsinchu Hsien (TW)

(72) Inventor: Shih-Han Hung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 994 days.

(21) Appl. No.: 13/669,720

(22) Filed: Nov. 6, 2012

(65) Prior Publication Data

US 2013/0321594 A1 Dec. 5, 2013

(30) Foreign Application Priority Data

Jun. 5, 2012 (TW) .............................. 101120186 A

(51) Int. Cl.
| | |
|---|---|
| H04N 13/04 | (2006.01) |
| H04N 13/00 | (2006.01) |
| H04N 21/43 | (2011.01) |
| H04N 21/81 | (2011.01) |

(52) U.S. Cl.
CPC ...... *H04N 13/0051* (2013.01); *H04N 21/4307* (2013.01); *H04N 21/816* (2013.01)

(58) Field of Classification Search
CPC ..................... H04N 13/0497; H04N 13/0404; H04N 13/0409; H04N 13/0422; G02B 27/2214
USPC ........................................................... 348/50
See application file for complete search history.

(56) References Cited

U.S. PATENT DOCUMENTS

2011/0134210 A1 * 6/2011 Tsukagoshi ........... G06T 7/0022
348/42

FOREIGN PATENT DOCUMENTS

| CN | 101047848 A | 10/2007 |
|---|---|---|
| WO | 2012077982 A2 | 6/2012 |

OTHER PUBLICATIONS

Chinese Office Action, Jul. 9, 2015, 8 pages.
Taiwan Office Action, Mar. 10, 2015, 5 pages.
Chinese Office Action dated Jan. 12, 2015, 8 pages.

* cited by examiner

*Primary Examiner* — William C Vaughn, Jr.
*Assistant Examiner* — Daniel Tekle
(74) *Attorney, Agent, or Firm* — Edell, Shapiro & Finnan, LLC

(57) ABSTRACT

An image synchronization method for a three-dimensional (3D) display apparatus is provided. The method includes steps of: receiving a plurality of first-eye image frames and a plurality of second-eye image frames; selecting a first image frame from the first-eye image frames according to a system time; selecting a second image frame from the second-eye image frames according to a timestamp of the first image frame; and outputting the first image frame and the second image frame.

19 Claims, 8 Drawing Sheets

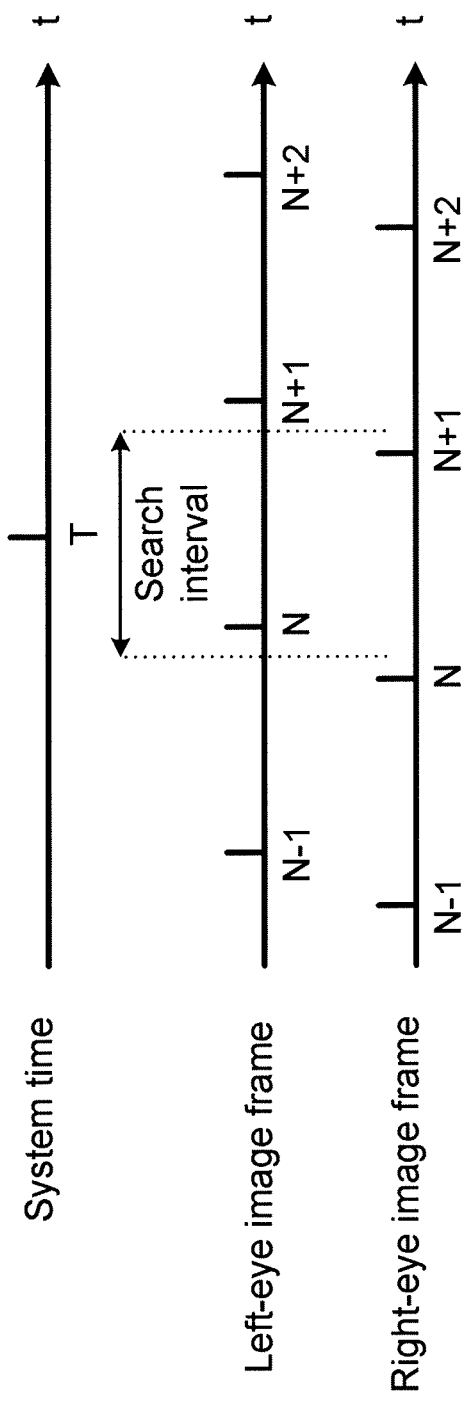

IMAGE SYNCHRONIZATION METHOD AND ASSOCIATED APPARATUS

This application claims the benefit of Taiwan application Serial No. 101120186, filed Jun. 5, 2012, the subject matter of which is incorporated herein by reference in its entirety.

BACKGROUND OF THE INVENTION

1. Field of the Invention

The invention relates in general to three-dimensional (3D) display, and more particularly to a synchronization method and associated apparatus for left-eye and right-eye images of a 3D display apparatus.

2. Description of the Related Art

As display techniques continuously progress, displays have evolved from earlier black-and-white televisions and color televisions to the current mainstream high-definition televisions. A common goal of all the displays in different eras is to represent more realistic and natural images for satisfying viewer demands. In the field of display techniques in recent years, 3D images are developed from 2D images to provide viewers with not only planar images and colors but also stereoscopic visual experiences.

A basic principle of the 3D display technique to generate a stereoscopic sensation utilizes parallax of the human eyes by providing two different images to left and right eyes. To generate a 3D effect, current techniques include polarized glasses, red (green) blue glasses, shutter glasses, head-mounted displays and parallax barricades—all of which need synchronization between left-eye and right-eye images. Therefore, in the event of poor synchronization accuracy, not only might there be a failure of forming depth perception in the brain from images perceived by both eyes, i.e., a stereoscopic sensation is not properly produced, but user discomfort or dizziness may even result.

FIG. 1 shows a flowchart of synchronizing a left-eye image and a right-eye image of a 3D image by a conventional solution. When playing a 3D image, stream data to be played is accessed in Step S110, and left-eye data, right-eye data and audio data are then demultiplexed from the stream data by a stream demultiplexer in Step S120. The left-eye data is decoded to obtain a left-eye image frame in Step S132, and a left-eye image frame is selected from a plurality of left-eye image frames according to a system time in Step S142. The right-eye data is decoded to obtain a right-eye image frame in Step S134, and a right-eye image frame is selected from a plurality of right-eye image frames according to the system time in Step S144. In Step S150, the frames selected in Step S142 and Step S144 are outputted.

The system time corresponds to the playback time of the images. Each left-eye frame and each right-eye image frame is respectively marked by a presentation time stamp (PTS), which indicates a time point at which each image frame is to be played. The PTS is referred to as a left-eye presentation time stamp (LPTS) in a left-eye image frame and a right-eye presentation time stamp (RPTS) in a right-eye image frame. Each LPTS has a closest corresponding RPTS, and vice versa, and the two corresponding frames containing the above LPTS and RPTS are referred to as the left-eye and right-eye image frames of the same set. To synchronize the left-eye and right-eye image frames, the left-eye and right-eye image frames of the same set are sequentially or simultaneously played at a particular time point. In practice, since a deviation often exists between the LPTS and RPTS of the left-eye and right-eye image frames of the same set, synchronization of the left-eye and right-eye image frames needs to be first performed to identify the left-eye and right-eye image frames of the same set. In a conventional solution, in the process of selecting a left-eye image frame in Step S142, in a search interval forwards and backwards along a system time T, a left-eye image frame marked with the LPTS closest to the system time T is searched. Similarly, in the process of selecting a right-eye image frame in Step S144, in a search interval forwards and backwards along the system time T, a right-eye image frame marked with the RPTS closest to the system time T is searched.

It is known from the above flowchart of image synchronization and associated descriptions that the conventional solution, by respectively selecting the LPTS and the RPTS closest to a system time, determines the left-eye image frame and the right-eye image frame corresponding to the LPTS and the RPTS, and assumes that the left-eye image frame having the selected LPTS and the right-eye image frame having the selected RPTS are image frames of the same set. FIG. 2 shows a schematic diagram of synchronizing a left-eye image and a right-eye image of a 3D image by a conventional solution. On a time axis t, according to the marked PTS, (N−1)th to (N+2)th left-eye image frames and (N−1)th to (N+2)th right-eye image frames are depicted, with the (N)th left-eye image frame and the (N)th right-eye image frame being frames of the same set, and so forth. It is observed from FIG. 2 that, on the time axis t, the left-eye and right-eye image frames of the same set are unaligned. The unaligned left-eye and right-eye image frames are due to a slight time difference between the left-eye and right-eye image frames at the time when recording the 3D image. According to the conventional image synchronization process, for a system time T, the (N)th left-eye image frame closest to the system time T is selected from the left-eye image frames, and the (N+1)th right-eye image frame closest to the system time T is selected from the right-eye image frames. Therefore, through the conventional synchronization solution, the (N)th left-eye image frame and the (N+1)th right-eye image frame are regarded as the same set and played synchronously. However, the (N)th right-eye image frame should be in fact synchronized with the (N)th left-eye image frame, and the (N+1)th right-eye image frame should be in fact by synchronized with the (N+1)th left-eye image frame. That is to say, in certain situations, the prior art is incapable of correctly synchronizing the left-eye and right-eye image frames.

SUMMARY OF THE INVENTION

It is an objective of the present invention to provide an image synchronization method and associated apparatus for preventing a synchronization error in left-eye and right-eye image frames caused in a conventional solution.

To achieve the above objective, an image synchronization method for a three-dimensional (3D) display apparatus is provided by the present invention. The method includes: providing a plurality of first-eye image frames and a plurality of second-eye image frames; selecting a first image frame from the first-eye image frames according to a system time; selecting a second image frame from the second-eye image frames according to a first timestamp of the first image frame; and outputting the first image frame and the second image frame.

To achieve the above objective, an image synchronization apparatus for a 3D display apparatus is further provided by the present invention. The image synchronization apparatus includes: a decoder, for decoding a plurality of first-eye image frames from a first-eye image data, and decoding a plurality of second-eye image frames from a second-eye image data; a first-eye image synchronizing unit, for selecting a first image frame from the first-eye image frames according to a system time; a second eye-image synchronizing unit, for selecting a second image frame from the second-eye image frames according to a timestamp of the first image frame; and an image outputting unit, for outputting the first image frame and the second image frame.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 2 is a schematic diagram of a conventional image synchronization solution.

DETAILED DESCRIPTION OF THE INVENTION

Figure 1:
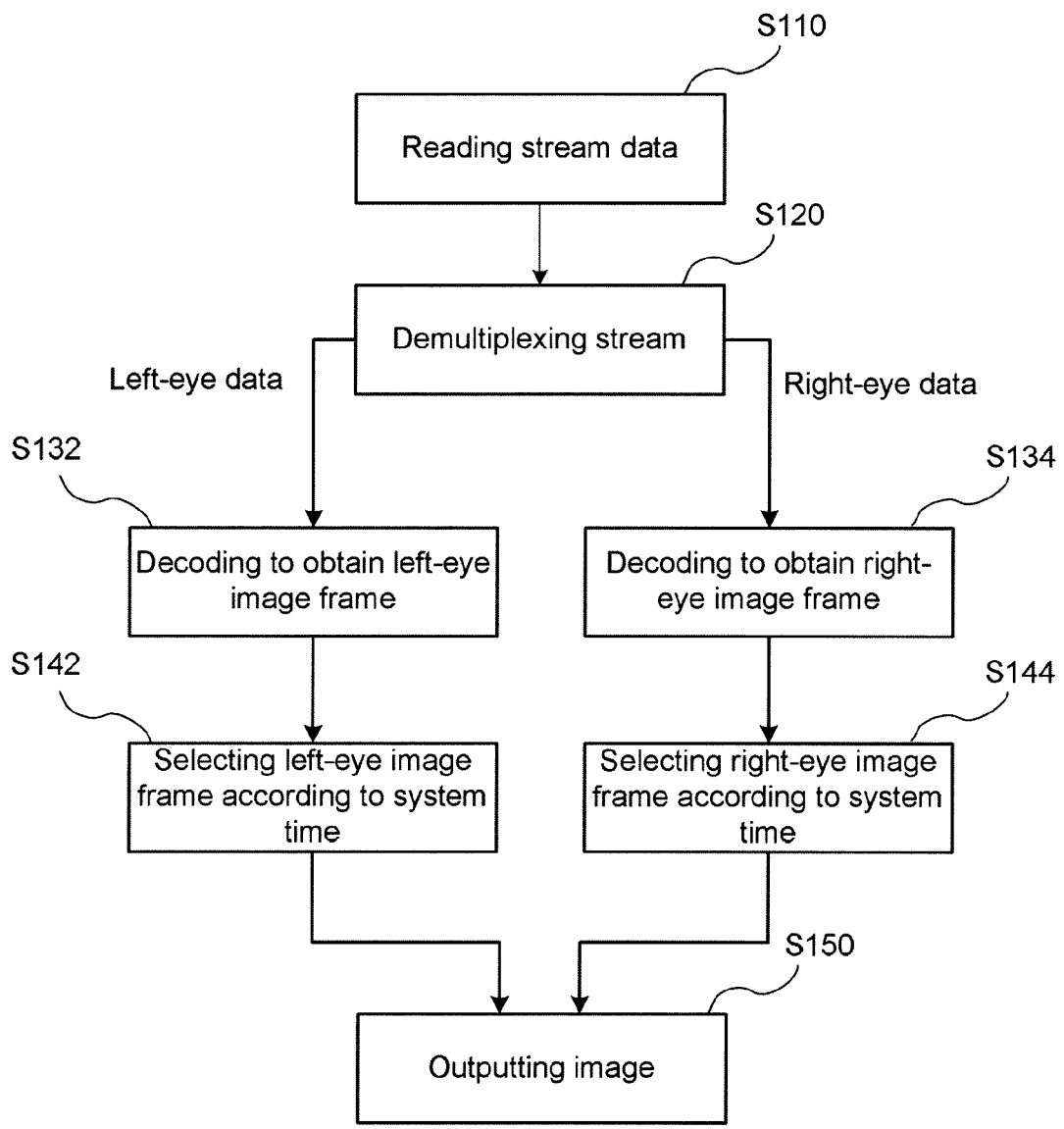
FIG. 1 is a flowchart of a conventional image synchronization solution.
Figure 3A:
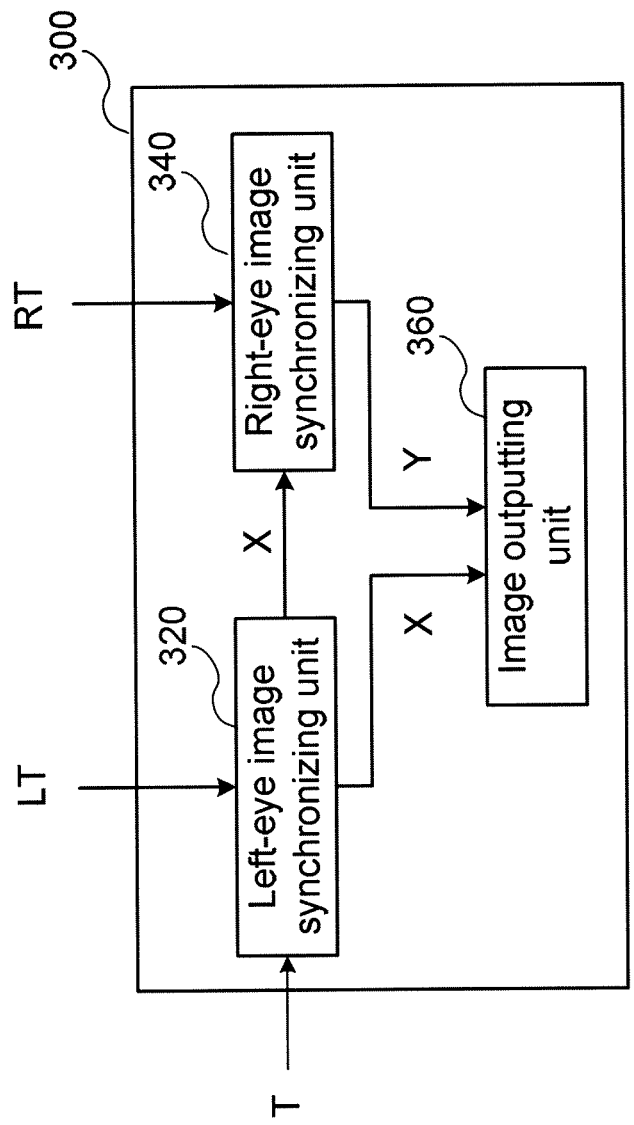
FIG. 3A is a block diagram of an image synchronization apparatus according to an embodiment of the present invention.

FIG. 3A shows a block diagram of an image synchronization apparatus according to an embodiment of the present invention. An image synchronization apparatus 300 includes a left-eye image synchronizing unit 320, a right-eye image synchronizing unit 340, and an image outputting unit 360. The left-eye image synchronizing unit 320 receives timestamps LT of a plurality of left-eye image frames, selects one of the left-eye image frames as a selection result X according to a system time T, and sends the selected result X to the image outputting unit 360 and the right-eye image synchronizing unit 340. The right-eye image synchronizing unit 340 receives timestamps RT of a plurality of right-eye image frames, selects one of the right-eye image frames as a selection result Y according to the selection result X from the left-eye image synchronizing unit 320, and sends the selection result Y to the image outputting unit 360. The image outputting unit 360 receives the selection result X and the selection result Y, accesses the left-eye image frame corresponding to the selection result X and the right-eye image frame corresponding to the selection result Y, and outputs the left-eye image frame and the right-eye image frame.

Figure 3B:
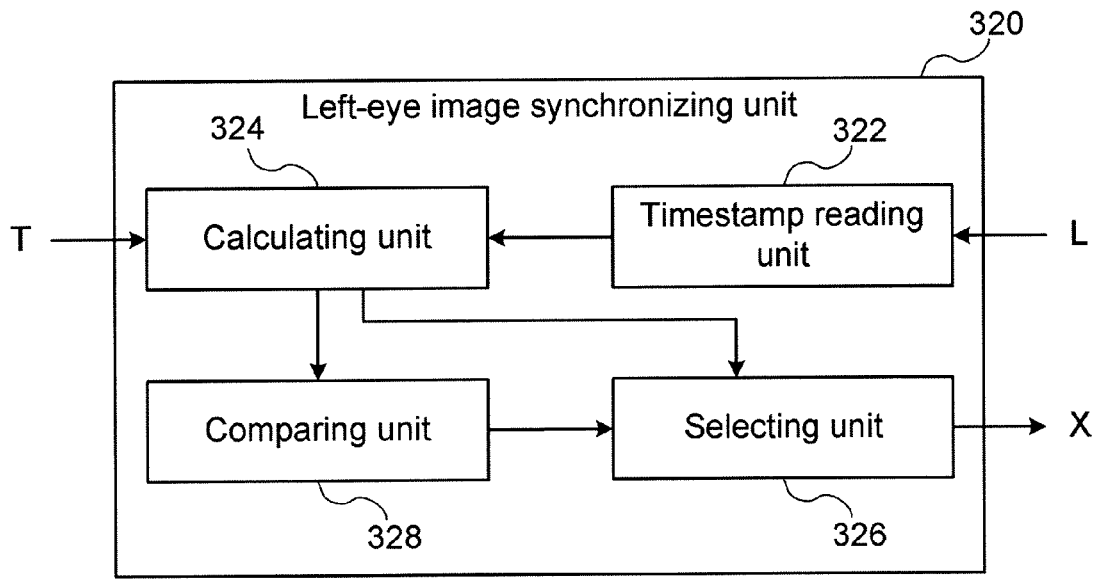
FIG. 3B is a block diagram of a left-eye image synchronizing unit according to an embodiment of the present invention.

FIG. 3B shows a block diagram of the left-eye image synchronizing unit 320 according to an embodiment of the present invention. The left-eye image synchronizing unit 320 includes a timestamp reading unit 322, a calculating unit 324, a selecting unit 326 and a comparing unit 328. The timestamp reading unit 322 reads timestamps LT of a plurality of left-eye image frames, and sends the timestamps LT to the calculating unit 324. For example, the timestamp reading unit 322 sequentially reads by a predetermined sequence from an earlier timestamp to a later timestamp according to the timestamps LT of the left-eye image frames. The calculating unit 324 receives the system time T and the timestamps LT from the timestamp reading unit 322, and obtains a first time difference between each the timestamps LT and the system time T through calculation. When the first time difference is smaller than a first threshold, the calculating unit 324 informs the selecting unit 326 to select an image frame from multiple image frames. When the first time difference is not smaller than the first threshold, the calculating unit 324 informs the comparing unit 328 to perform a sorting procedure on the system time T and the timestamps LT from the timestamp reading unit 322. When the system time T is earlier than the timestamps LT sent from the timestamp reading unit 322, the comparing unit 328 informs the selecting unit 326 to select an image frame from multiple image frames. According to the information providing by the calculating unit 324 and the comparing unit 328, the selecting unit 326 selects an image frame from a plurality of left-eye image frames as the selection result X, and sends the selection result X. The selection result X includes time information of an image frame. In the above descriptions of the present invention, the timestamp refers to time information marked in an image frame, e.g., a playback time point.

Figure 3C:
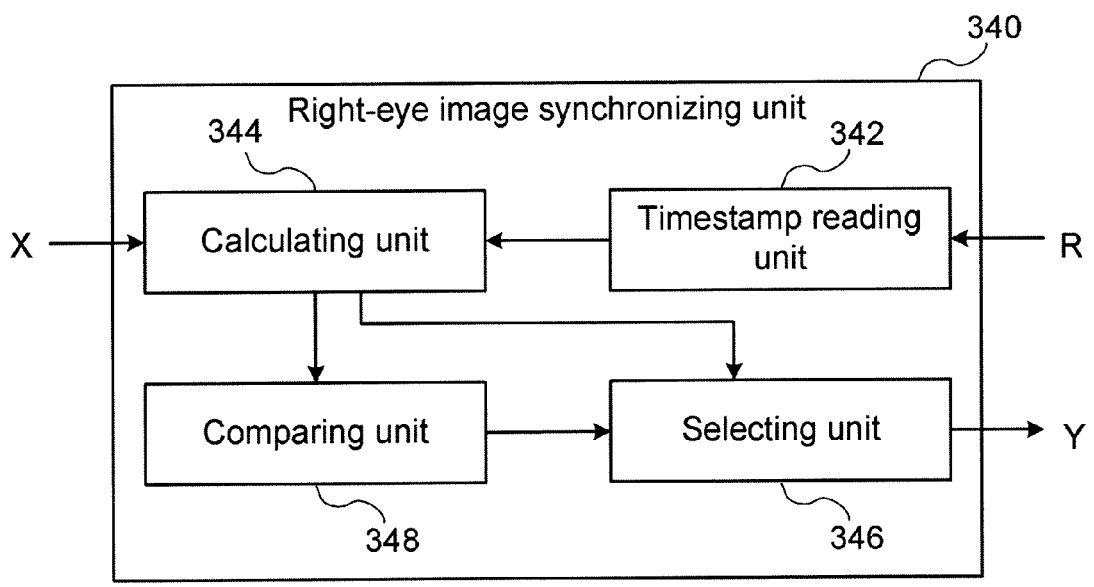
FIG. 3C is a block diagram of a right-eye image synchronizing unit according to an embodiment of the present invention.

FIG. 3C shows a block diagram of the right-eye image synchronizing unit 340 according to an embodiment of the present invention. The right-eye image synchronizing unit 340 includes a timestamp reading unit 342, a calculating unit 344, a selecting unit 346 and a comparing unit 348. The timestamp reading unit 342 reads timestamps RT of the plurality of right-eye image frames, and sends the timestamps RT to the calculating unit 344. For example, the timestamp reading unit 342 sequentially reads by a predetermined sequence from an earlier timestamp to a later timestamp according to timestamps RT of the right-eye image frames. The calculating unit 344 reads the time information in the selection result X sent from the selecting unit 326 and the timestamps RT sent from the timestamp reading unit 342, and obtains a second time difference between each the timestamps RT and the selection result X through calculation. When the second time difference is smaller than a second threshold, the calculating unit 344 informs the selecting unit 346 to select an image frame from multiple image frames. When the second time difference is not smaller than the second threshold, the calculating unit 344 informs the comparing unit 348 to perform a sorting procedure on the time information in the selection result X and the timestamps RT from the timestamp reading unit 342. When the time information in the selection result X is earlier than the timestamps RT sent from the timestamp reading unit 342, the comparing unit 348 informs the selecting unit 346 to select an image frame from multiple image frames. According to the information provided by the calculating unit 344 and the comparing unit 348, the selecting unit 346 selects an image frame from a plurality of right-eye image frames as the selection result Y, and sends the selection result Y. The selection result Y includes time information of an image frame.

In an embodiment of the present invention, the left-eye image synchronizing unit 320, the right-eye image synchronizing unit 340, and the image outputting unit 360 may be implemented by software or logic executed by a central processor.

Figure 4:
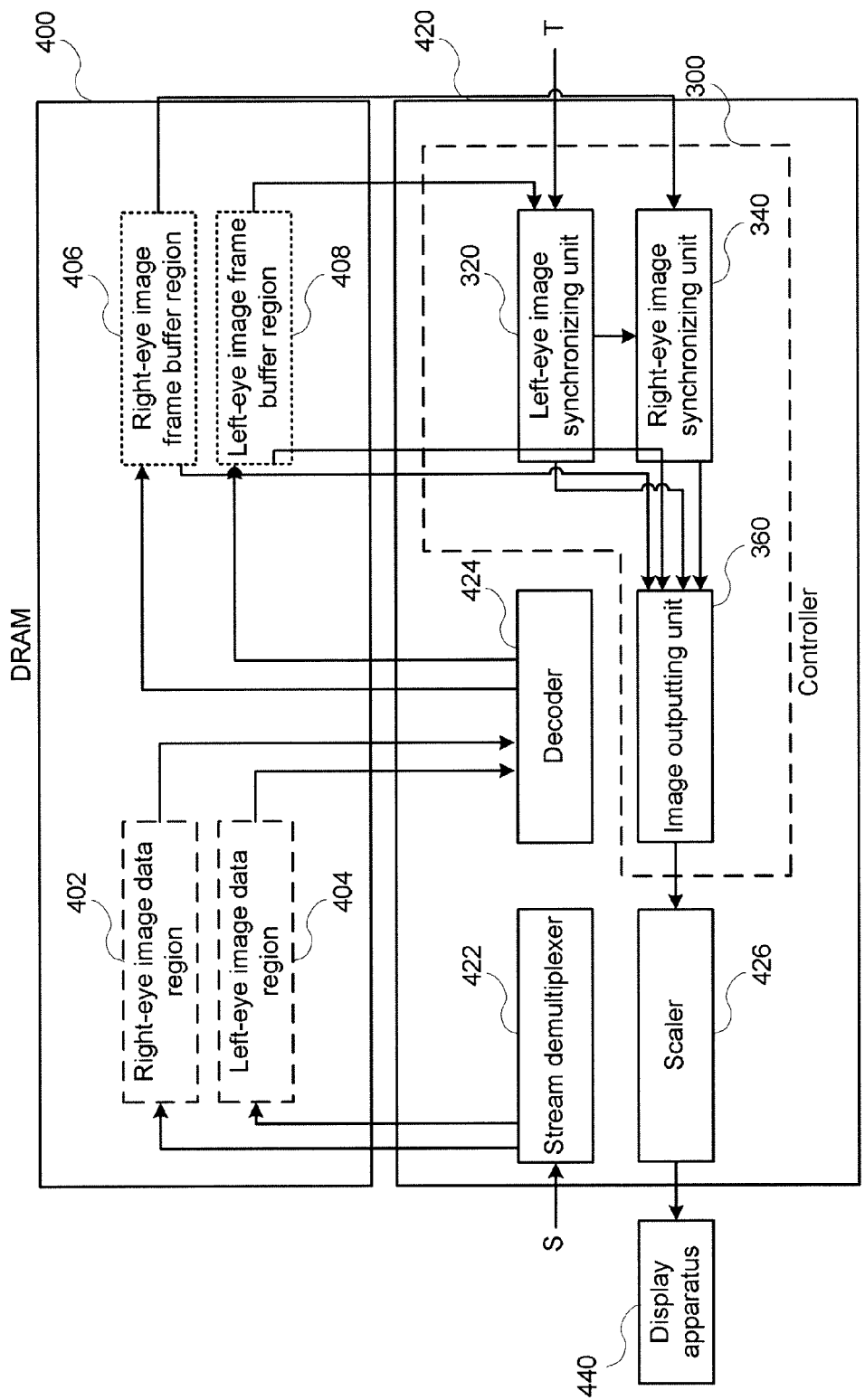
FIG. 4 is a block diagram of a synchronization apparatus applied to a 3D display apparatus according to an embodiment of the present invention.

FIG. 4 shows a block diagram of a synchronization apparatus applied in image synchronization of a 3D display apparatus according to an embodiment of the present invention. A dynamic random access memory (DRAM) 400 includes a right-eye image data region 402, a left-eye image data region 404, a right-eye image frame buffer region 406, and a left-eye image buffer region 408. A controller 420 includes a stream demultiplexer 422, a synchronization apparatus 300, a scaler 426, and a decoder 424. The synchronization apparatus 300 includes a left-eye image synchronizing unit 320, a right-eye synchronizing unit 340, and an image outputting unit 360. The stream demultiplexer 422 demultiplexes right-eye data and left-eye data from a video stream S according to information in packet headers in the video stream S, and respectively stores the right-eye image data and the left-eye image data into the right-eye image data region 402 and the left-eye image data region 404. That is, the right-eye image data region 402 and the left-eye image data region 404 respectively store the right-eye image data and the left-eye image data. The decoder 424 reads the right-eye image data from the right-eye image data region 402, decodes the right-eye image data to obtain right-eye image frames, and writes the right-eye image frames into the right-eye image frame buffer region 406. Further, the decoder 424 reads the left-eye image data from the left-eye image data region 404, decodes the left-eye image data to obtain left-eye image frames, and writes the left-eye image frames into the left-eye image frame buffer region 408. That is, the right-eye image frame buffer region 406 and the left-eye image frame buffer region 408 store the decoded image frames. The left-eye image synchronizing unit 320 receives the timestamps L of a plurality of left-eye image frames from the left-eye image frame buffer region 408, selects one of the left-eye image frames as a selection result X according to the system time T, and sends the selection result X to the image outputting unit 360 and the right-eye image synchronizing unit 340. The right-eye image synchronizing unit 340 receives the timestamps R of a plurality of right-eye image frames from the right-eye image frame buffer region 406, selects one of the right-eye image frames as a selection result Y according to the selection result X from the left-eye synchronizing unit 320, and sends the selection result Y to the image outputting unit 360. The image outputting unit 360 receives the selection result X of the left-eye image synchronizing unit 320 and the selection result Y of the right-eye image synchronizing unit 340, accesses an left-eye image frame IL corresponding to the selection result X of the left-eye image synchronizing unit 320 from the left-eye image frame buffer region 408, and accesses a right-eye image frame IR corresponding to the selection result Y of the right-eye image synchronizing unit 340 from the right-eye image frame buffer region 406. The image outputting unit 360 further outputs the left-eye image frame IL and the right-eye image frame IR to the scaler 426. The scaler 426 receives and scales the left-eye image frame IL and the right-eye image frame IR, and sends scaled IL and IR to a display apparatus 440. The display apparatus 400 displays the scaled IL and IR to complete playback of the 3D image.

Figure 5:
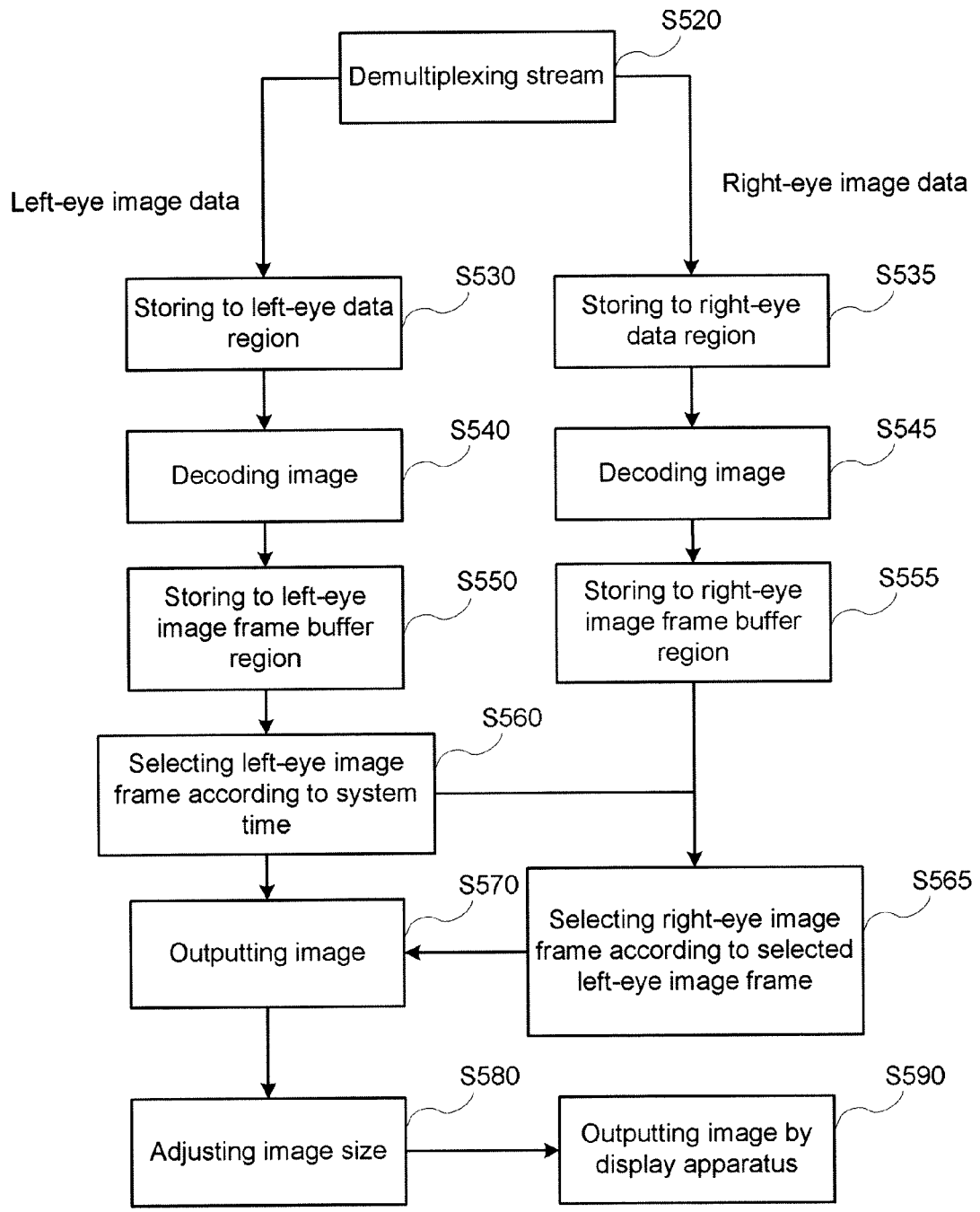
FIG. 5 is a flowchart of an image synchronization method according to an embodiment of the present invention.

FIG. 5 shows a flowchart of an image synchronization method according to an embodiment of the present invention. The method begins with Step S520, in which the stream demultiplexer 422 receives video stream data and demultiplexes the video stream data into left-eye image data, right-eye image data, and audio data. In Step S530, the left-eye image data is stored into the left-eye image data region 404. In Step S540, the decoder 424 accesses the left-eye image data stored in the left-eye image data region 404 and decodes the left-eye image data to left-eye image frames. In Step S550, the left-eye image frames are stored into the left-eye image frame buffer region 408. Similarly, in Step S535, the right-eye image data is stored into the right-eye image data region 402. In Step S545, the decoder 424 accesses the right-eye image data in the right-eye image data region 402, and decodes the right-eye image data to right-eye image frames. In Step S555, the right-eye image frames are stored into the right-eye image frame buffer region 408. In Step S560, the left-eye image synchronizing unit 320 receives the timestamps L of a plurality of left-eye image frames from the left-eye image frame buffer region 408, selects one of the left-eye image frames as a selection result X according to a system time T, and sends the selection result X to the image outputting unit 360 and the right-eye image synchronizing unit 340. In Step S565, the right-eye image synchronizing unit 340 receives the timestamps R of a plurality of right-eye image frames from the right-eye image frame buffer region 406, selects one of the right-eye image frames as a selection result Y according to the selection result X of Step S560, and sends the selection result Y to the image outputting unit 360. In Step S570, the image outputting unit 360 receives the selection result X of Step S560 and the selection result Y in Step S565, accesses the left-eye image frame IL corresponding to the selection result X from the left-eye image frame buffer region 408 and the right-eye image frame IR corresponding to the selection result Y, and sends the left-eye image frame IL and the right-eye image frame IR to the scaler 426. In Step S580, the scaler 426 scales the image size of the left-eye image frame IL and the right-eye image frame IR. In Step S590, the display apparatus 440 displays the scaled IL and IR to complete synchronization of the 3D image.

It should be noted that, in this embodiment, the decoding processes in Step S540 and Step S545 are performed by the same decoder 424. In an alternatively embodiment, the decoding processes in Step S540 and Step S545 may be performed by two difference decoders. For example, different decoders may be employed when the left-eye image frames and the right-eye image frames are encoded by different encoding processes. Further, in this embodiment, a left-eye image frame is first selected and then a right-eye image frame is selected according to the left-eye image frame. In practice, a right-eye image frame may be first selected, followed by selecting a left-eye image frame according to the right-eye image frame.

Figure 6A:
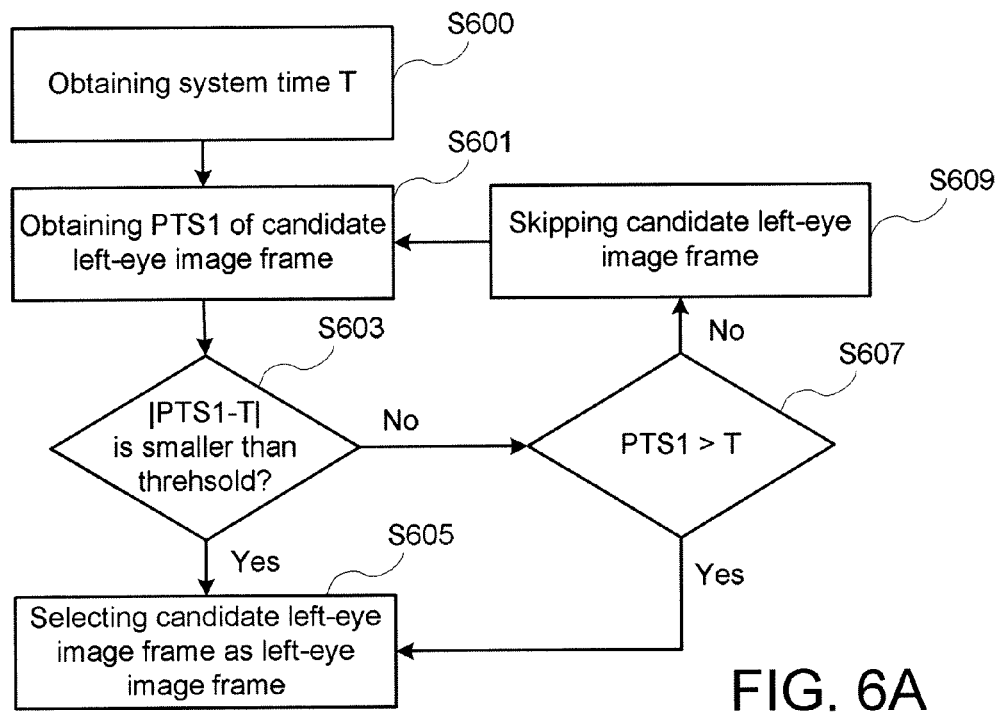
FIG. 6A is a flowchart of a step of selecting a left-eye image frame according to a system time in the image synchronization method in FIG. 5 according to an embodiment of the present invention.

FIG. 6A shows a flowchart of Step S560 in FIG. 5. In Step S600, the system time T is obtained. In Step S601, the timestamp reading unit 322 obtains a first timestamp PTS1 of a candidate left-eye image frame from the left-eye image frame buffer region 408. In Step S603, the calculating unit 324 calculates a first time difference between the system time T and the first timestamp PTS1. Step S605 is performed when the first time difference is smaller than a first threshold, or else Step S607 is performed. In Step S605, the selecting unit 326 selects an image frame corresponding to the first timestamp PTS1, and sends the selection result to the right-eye image synchronizing unit 340 and the image outputting unit 360. In Step S607, the comparing unit 328 compares sequences of the system time T and the first timestamp PTS1. Step S605 is performed when the system time T is earlier than the first timestamp PTS1, or else Step S609 is performed. In Step S609, the candidate left-eye image frame is skipped and left unselected.

Figure 6B:
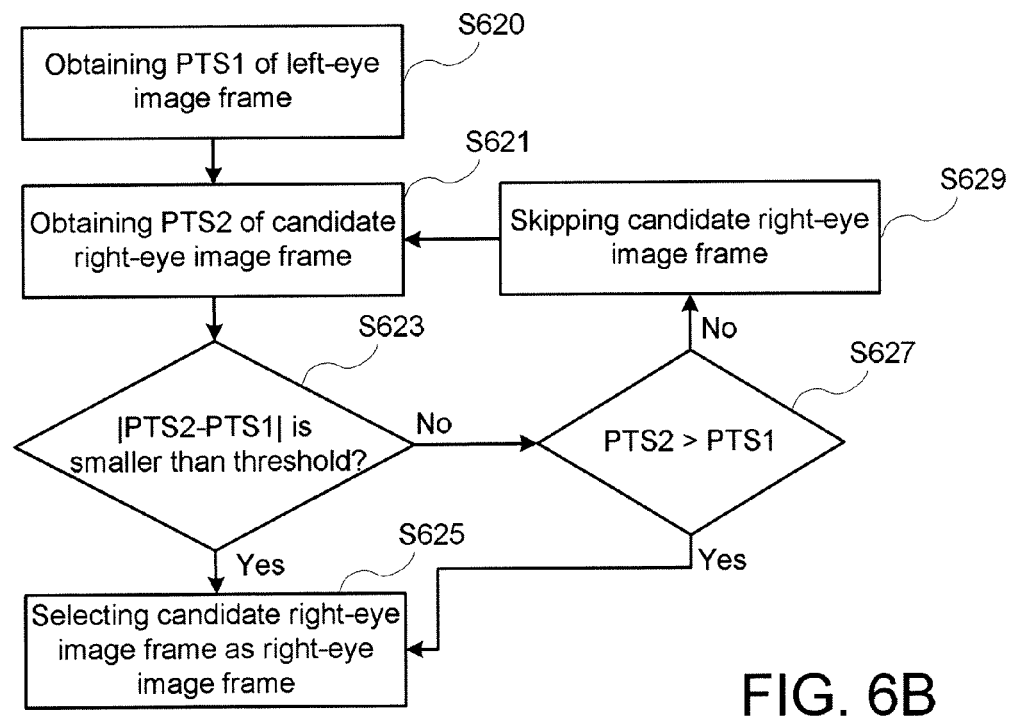
FIG. 6B is a flowchart of a step of selecting a right-eye image frame according to a selected left-eye image in the image synchronization method in FIG. 5 according to an embodiment of the present invention.

FIG. 6B shows a flowchart of Step S565 in FIG. 5. In Step S620, the calculating unit 344 obtains the first timestamp PTS1 of the selected image frame in Step S605 in FIG. 6A. In Step S621, the timestamp reading unit 342 obtains a second timestamp PTS2 of a candidate right-eye image frame from the right-eye image frame buffer region 406. In Step S623, the calculating unit 344 calculates a second time difference between the second timestamp PTS2 and the first timestamp PTS1. Step S625 is performed when the second time difference is smaller than a second threshold, or else Step S627 is performed. In Step S625, the selecting unit 346 selects an image frame corresponding to the second timestamp PTS2 from a plurality of right-eye image frames, and sends the selection result to the image outputting unit 360. In Step S627, the comparing unit 348 compares the second timestamp PTS2 and the first timestamp PTS1. Step S625 is performed when the first timestamp PTS1 is earlier than the second timestamp PTS2, or else Step S629 is performed. In Step S629, the candidate right-eye image frame is skipped and left unselected.

It should be noted that, in the above embodiments, the first threshold and the second threshold may be adjusted based on actual requirements.

Figure 7:
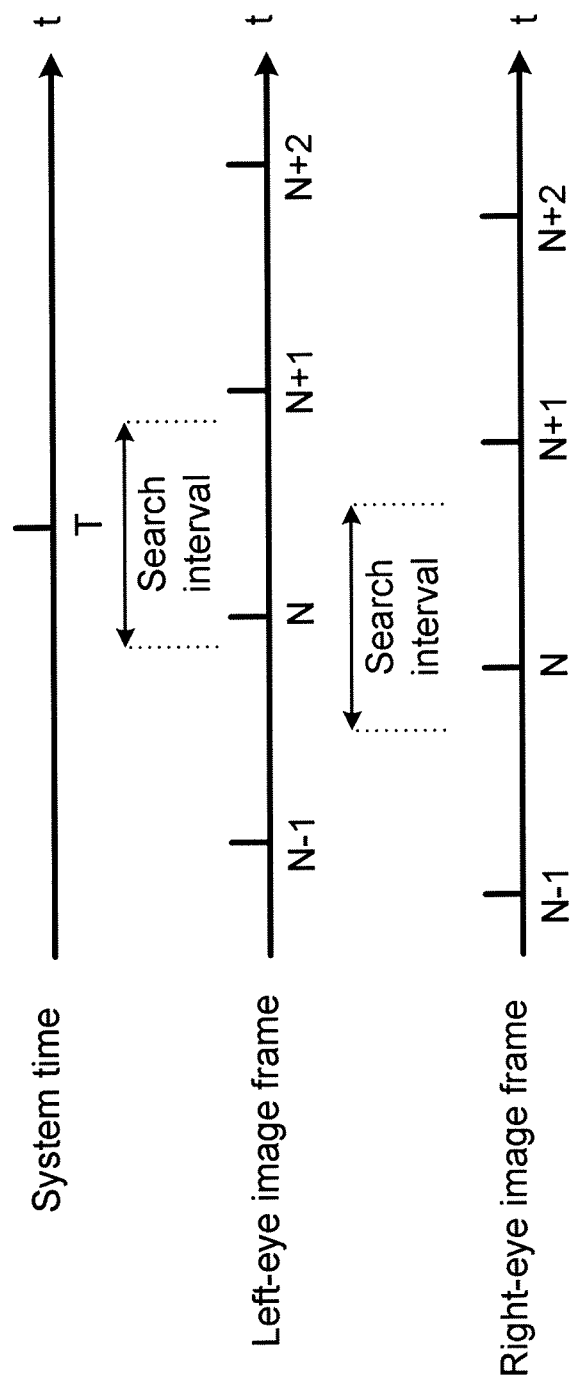
FIG. 7 is a schematic diagram of image synchronization of the present invention.

FIG. 7 shows a schematic diagram of synchronizing left-eye and right-eye images of a 3D image. On a time axis t, according to the marked PTS, (N−1)th to (N+2)th left-eye image frames and (N−1)th to (N+2)th right-eye image frames are depicted, with the (N)th left-eye image frame and the (N)th right-eye image frame being image frames of the same set, and so forth. According to the process of the image synchronization method of the present invention, for a system time T, the (N)th left-eye image frame closest to the system time T is selected from the left-eye image frames, and the (N)th right-eye image frame closest to the (N)th left-eye image frame is selected from the right-eye image frames. Therefore, through the image synchronization method of the present invention, the (N)th left-eye image frame and the (N)th right-eye image frame are regarded as the same set and played synchronously. That is to say, through the image synchronization method of the present invention, the left-eye and right-eye image frames of the same set are accurately identified.

It is seen from the above descriptions that, when performing image synchronization in the present invention, a left-eye image frame corresponding to a system time T is first selected. That is, the left-eye image frame has a left-eye image frame timestamp closest to the system time T. A right-eye image frame corresponding to the left-eye image frame is then selected. That is, the right-eye image frame has a right-eye image frame timestamp closest to the left-eye image frame timestamp. Since the selected right-eye image frame should be a right-eye image frame closest to the selected left-eye image, the left-eye and right-eye image frames are then precisely the left-eye and right-eye image frames of the same set. Therefore, the issue of misjudging left-eye and right-eye image frames of different sets as left-eye and right-eye image frames of the same set based on the left-eye and right-eye image frames corresponding to the system time T in the conventional solution is eliminated. Further, the image synchronization method of the present invention does not limit the sequence for determining the left-eye image frame and the right-eye image frame.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image synchronization method for three-dimensional (3D) display, comprising:
   receiving a plurality of first-eye image frames and a plurality of second-eye image frames;
   selecting a first image frame from the first-eye image frames according to a system time;
   selecting a second image frame from the second-eye image frames according to a first timestamp of the first image frame; and
   outputting the first image frame and the second image frame,
   wherein the step of selecting the first image frame from the first-eye image frames according to the system time comprises:
   obtaining the system time;
   obtaining a second timestamp of a first candidate image frame from the first-eye image frames;
   calculating a first time difference between the system time and the second timestamp; and
   selecting the first candidate image frame as the first image frame when the first time difference is smaller than a first threshold.

2. The image synchronization method according to claim 1, wherein the system time is an image playback time.

3. The image synchronization method according to claim 1, wherein the step of obtaining the second timestamp of the first candidate image frame from the first-eye image frames obtains the second timestamp of the first candidate image frame from the first-eye image frames according to a time sequence.

4. The image synchronization method according to claim 3, further comprising:
   comparing sequences of the system time and the second timestamp when the first time difference is not smaller than the first threshold, and selecting the first candidate image frame as the first image frame when the system time is earlier than the second timestamp.

5. The image synchronization method according to claim 1, wherein the second timestamp is a playback time point marked for the first candidate image frame.

6. The image synchronization method according to claim 1, wherein the step of selecting the second image frame from the second-eye image frames according to the first timestamp of the first image frame comprises:
   obtaining a third timestamp of a second candidate image frame from the second-eye image frames;
   calculating a second time difference between the first timestamp and the third timestamp; and
   selecting the second candidate image frame as the second image frame when the second time difference is smaller than a second threshold.

7. The image synchronization method according to claim 6, further comprising:

comparing sequences of the first timestamp and the third timestamp when the second time difference is not smaller than the second threshold, and selecting the second candidate image frame as the second image frame when the first timestamp is earlier than the third timestamp.

8. The image synchronization method according to claim 6, wherein the third timestamp is a playback time point marked for the second candidate image frame.

9. An image synchronization apparatus for 3D display, comprising:
    a decoder, for decoding a plurality of first-eye image frames from a first-eye image data, and decoding a plurality of second-eye image frames from a second-eye image data;
    a first-eye image synchronizing unit, for selecting a first image frame from the first-eye image frames according to a system time;
    a second-eye image synchronizing unit, for selecting a second image frame from the second-eye image frames according to a first timestamp of the first image frame; and
    an image outputting unit, for outputting the first image frame and the second image frame,
    wherein the first-eye image synchronizing unit comprises:
    a first timestamp reading unit, for obtaining a second timestamp of a first candidate image frame from the first-eye image frames;
    a first calculating unit, for calculating a first time difference between the system time and the second timestamp; and
    a first selecting unit, for selecting the first candidate image frame as the first image frame when the first time difference is smaller than a first threshold.

10. The image synchronization apparatus according to claim 9, wherein the system time is an image playback time.

11. The image synchronization apparatus according to claim 9, wherein the first timestamp reading unit obtains the second timestamp of the first candidate image frame according to a time sequence.

12. The image synchronization apparatus according to claim 11, further comprising:
    a first comparing unit, for comparing sequences of the system time and the second timestamp when the first time difference is not smaller than the first threshold, and informing the first selecting unit selecting the first candidate image frame as the first image frame when the system time is earlier than the second timestamp.

13. The image synchronization apparatus according to claim 9, wherein the second timestamp is a playback time point marked for the first candidate image frame.

14. The image synchronization apparatus according to claim 9, wherein the second-eye image synchronizing unit comprises:
    a third timestamp reading unit, for obtaining a third timestamp of a second candidate image frame from the second-eye image frames;
    a second calculating unit, for calculating a second time difference between the first timestamp and the third timestamp; and
    a second selecting unit, for selecting the second candidate image frame as the second image frame when the second time difference is smaller than a second threshold.

15. The image synchronization apparatus according to claim 14, further comprising:
    a second comparing unit, for comparing sequences of the first timestamp and the third timestamp when the second time difference is not smaller than the second threshold, and informing the second selecting unit selecting the second candidate image frame as the second image frame when the first timestamp is earlier than the third timestamp.

16. The image synchronization apparatus according to claim 14, wherein the third timestamp is a playback time point marked for the second candidate image frame.

17. The image synchronization apparatus according to claim 9, wherein the first-eye image synchronizing unit and the second-eye image synchronizing unit are implemented through software executed by a processor.

18. An image synchronization method for three-dimensional (3D) display, comprising:
    receiving a plurality of first-eye image frames and a plurality of second-eye image frames;
    selecting a first image frame from the first-eye image frames according to a system time;
    selecting a second image frame from the second-eye image frames according to a first timestamp of the first image frame; and
    outputting the first image frame and the second image frame,
    wherein the step of selecting the second image frame from the second-eye image frames according to the first timestamp of the first image frame comprises:
    obtaining a third timestamp of a second candidate image frame from the second-eye image frames;
    calculating a second time difference between the first timestamp and the third timestamp; and
    selecting the second candidate image frame as the second image frame when the second time difference is smaller than a second threshold.

19. An image synchronization apparatus for 3D display, comprising:
    a decoder, for decoding a plurality of first-eye image frames from a first-eye image data, and decoding a plurality of second-eye image frames from a second-eye image data;
    a first-eye image synchronizing unit, for selecting a first image frame from the first-eye image frames according to a system time;
    a second-eye image synchronizing unit, for selecting a second image frame from the second-eye image frames according to a first timestamp of the first image frame; and
    an image outputting unit, for outputting the first image frame and the second image frame,
    wherein the second-eye image synchronizing unit comprises:
    a third timestamp reading unit, for obtaining a third timestamp of a second candidate image frame from the second-eye image frames;
    a second calculating unit, for calculating a second time difference between the first timestamp and the third timestamp; and
    a second selecting unit, for selecting the second candidate image frame as the second image frame when the second time difference is smaller than a second threshold.

* * * * *